United States Patent
van den Hazel

[11] Patent Number: 5,325,768
[45] Date of Patent: Jul. 5, 1994

[54] APPARATUS FOR BREAKING AND OPENING EGGS

[75] Inventor: Brand van den Hazel, Putten, Netherlands

[73] Assignee: FPS Food Processing Systems B.V., Barneveld, Netherlands

[21] Appl. No.: 50,183

[22] PCT Filed: Nov. 8, 1991

[86] PCT No.: PCT/NL91/00223
§ 371 Date: May 3, 1993
§ 102(e) Date: May 3, 1993

[87] PCT Pub. No.: WO92/08402
PCT Pub. Date: May 29, 1992

[30] Foreign Application Priority Data
Nov. 9, 1990 [NL] Netherlands ............... 9002455

[51] Int. Cl.⁵ ............... A23J 1/09; A47J 43/14
[52] U.S. Cl. ............... 99/498; 99/497; 99/500
[58] Field of Search ............... 99/495–500, 99/568, 577–582; 426/490, 478–480, 614

[56] References Cited

U.S. PATENT DOCUMENTS

| | | | |
|---|---|---|---|
| 3,185,194 | 5/1965 | Ellis et al. | 99/500 |
| 3,203,458 | 8/1965 | Shelton et al. | 99/500 X |
| 3,370,691 | 2/1968 | Mosterd. | |
| 3,455,356 | 7/1969 | Classen. | |
| 3,480,056 | 11/1969 | Willsey | 99/498 |
| 4,111,111 | 9/1979 | Willsey | 99/538 X |
| 4,134,333 | 1/1979 | Warren | 99/577 X |
| 4,137,837 | 2/1979 | Warren | 426/490 X |
| 4,137,838 | 2/1979 | Warren | 99/500 |
| 4,321,864 | 3/1982 | Willsey | 99/582 X |
| 4,534,284 | 8/1985 | Fujimura et al. | 99/498 |
| 4,541,330 | 9/1985 | Fujimura | 99/497 X |
| 4,799,423 | 1/1989 | Willsey | 99/500 |

FOREIGN PATENT DOCUMENTS

| | | |
|---|---|---|
| 1920390 | 11/1969 | Fed. Rep. of Germany. |
| 1489700 | 6/1967 | France. |
| 0770464 | 10/1980 | U.S.S.R. ............... 99/499 |
| 914629 | 1/1963 | United Kingdom. |
| 8905097 | 6/1989 | World Int. Prop. O.. |

Primary Examiner—Timothy F. Simone
Attorney, Agent, or Firm—Griffin Butler Whisenhunt & Kurtossy

[57] ABSTRACT

An apparatus for breaking and opening eggs and for removing and catching the yolks and whites thereof. A first conveyor is adapted to travel in a first direction of travel. Supply belts supply eggs to the first conveyor. Egg carriers are operably connected to the first conveyor for carrying eggs supplied from the supply belts. Egg receiving members are operably connected to each egg carrier for receiving eggs carried by each carrier. An egg opening element is operably associated with each egg carrier for breaking and opening eggs received by the egg receiving members. A second conveyor is adapted to travel underneath and in alignment with at least a portion of travel of the first conveyor. Egg holders are operably connected to the second conveyor. Cup members are operably connected to each egg holder for catching the yolk and white of the eggs openable by the opening element. In the improvement, a plurality of egg carriers are oriented in a direction transverse to the first direction of travel of the first conveyor. A plurality of juxtapositioned egg receiving members are disposed on each egg carrier and are configured to receive an egg with the longitudinal axis thereof oriented in the first direction of travel of the first conveyor.

4 Claims, 5 Drawing Sheets

APPARATUS FOR BREAKING AND OPENING EGGS

BACKGROUND OF THE INVENTION

This invention relates to an apparatus for breaking and opening eggs in a controlled way and for catching and removing the yolks and egg whites, said apparatus comprising at least one supply belt for feeding eggs to a conveyor equipped with egg carriers, comprising egg-receiving and opening elements, the conveyor being a first conveyor whose egg carriers, after the eggs have been opened, transfer the contents of the eggs to holders with cups mounted on a second conveyor which travels in alignment with, and is located under, the first conveyor at least for the portion of the path of travel where the contents of the eggs are transferred.

Such apparatus is known from GB-A-914,629. This apparatus is a rather complicated construction, having three transfer points and a handling capacity which is limited by the number of individual egg opening elements, that can be placed at the periphery of the frame structure.

SUMMARY OF THE INVENTION

It is an object of the invention to provide an apparatus of the above described type having a simplified construction with less transfer points, an increased handling capacity within about the same volume and the possibility of visual inspection, in which apparatus the eggs are positioned with their longitudinal axes placed horizontally during the cracking and emptying steps.

According to the invention an apparatus is provided in which each egg carrier of the first conveyor is directed transversely to the direction of travel of said first conveyor and comprises a plurality of juxtaposed egg-receiving positions with opening elements, the eggs being positioned in said positions with their longitudinal axes oriented in the direction of travel of said first conveyor, the number of supply belts being equal to the number of egg-receiving positions on each egg carrier, each supply belt being arranged in such a way that it transfers the eggs supplied exclusively to a defined one of the plurality of juxtaposed egg receiving positions.

In the apparatus according to the invention the first conveyor combines the functions of feed conveyor and frame structure, by mounting egg carriers comprising opening elements on said first conveyor. These egg carriers are adaped to support a plurality of eggs, two in the embodiment shown. The problem of delivering eggs in the correct egg receiving position on said egg carriers is solved by installing as many separate supply belts as there are egg receiving positions on each carrier, each supply belt delivering eggs to a defined egg receiving position on an egg carrier.

Preferably each egg holder of the second conveyor comprises a plurality of separate, juxtaposed cups for receiving the yolks and egg white from the broken eggs, present in the egg receiving positions which cups are located under the plurality of juxtaposed egg receiving positions of the first conveyor when both conveyors are traveling in alignment with each other.

Each egg carrier is preferably pivotally connected to a holder element of the first conveyor, whereas, the different supply belts are mounted at a different height level in such a way that the transfer end of each supply belt is located at about the same distance above the related egg receiving position of the downwardly pivoted egg carriers.

An embodiment of an apparatus according to the invention will now be described with reference to the accompanying drawings, in which.

DESCRIPTION OF PREFERRED EMBODIMENTS

Figure 1:
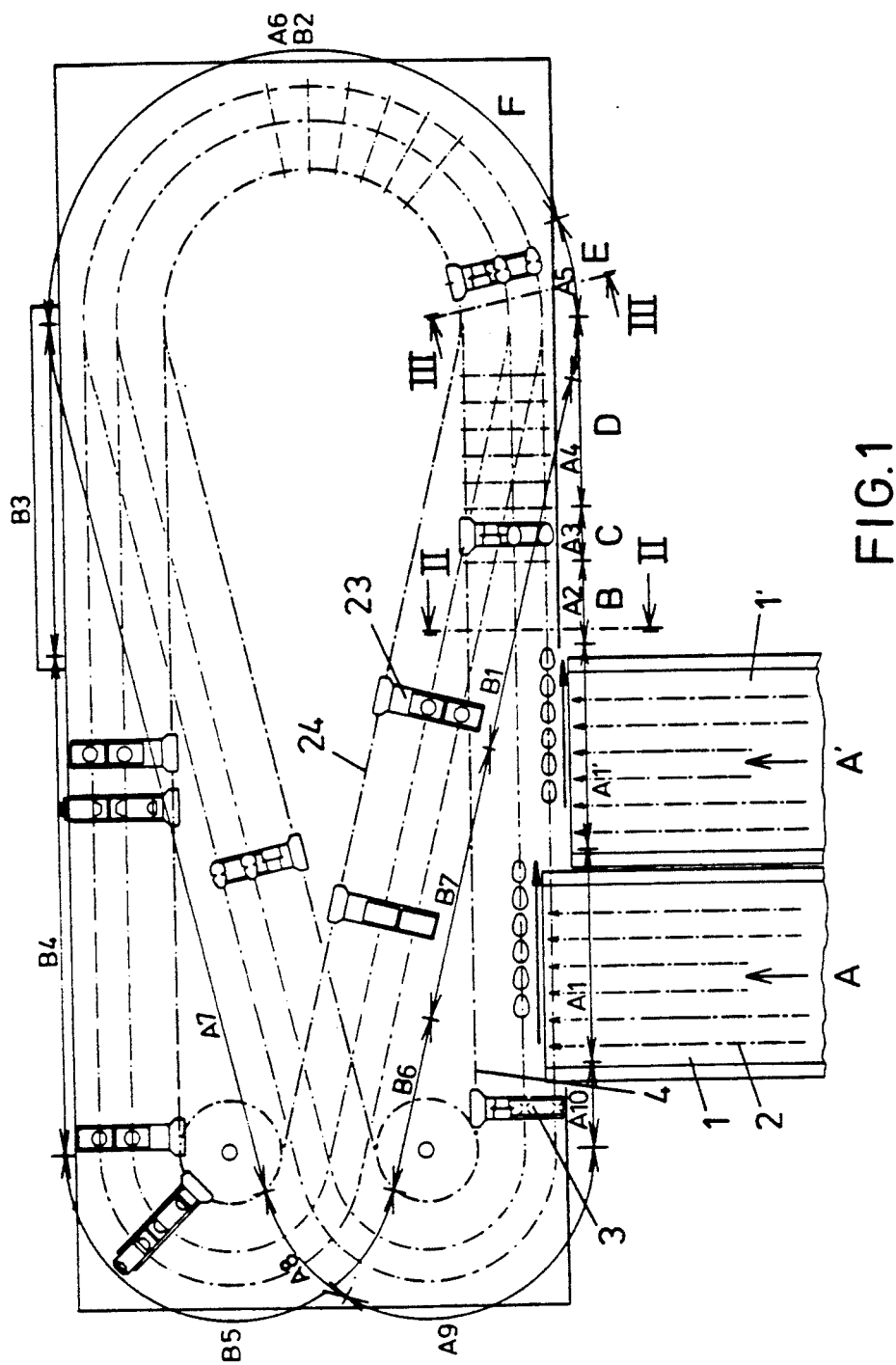
FIG. 1 is a top plan view of an apparatus for breaking and opening eggs in a controlled way and for separating and separately catching and removing yolks and egg whites.

Referring to the drawings and FIG. 1 in particular, an apparatus for breaking and opening of eggs and for separating and separately catching and removing the yolks and egg whites comprises a plurality of supply belts, in this case two, numbered 1 and 1'. Each supply belt comprises a plurality of parallel rows 2 for feeding eggs to a conveyor 4 provided with egg carriers 3.

Figure 2:
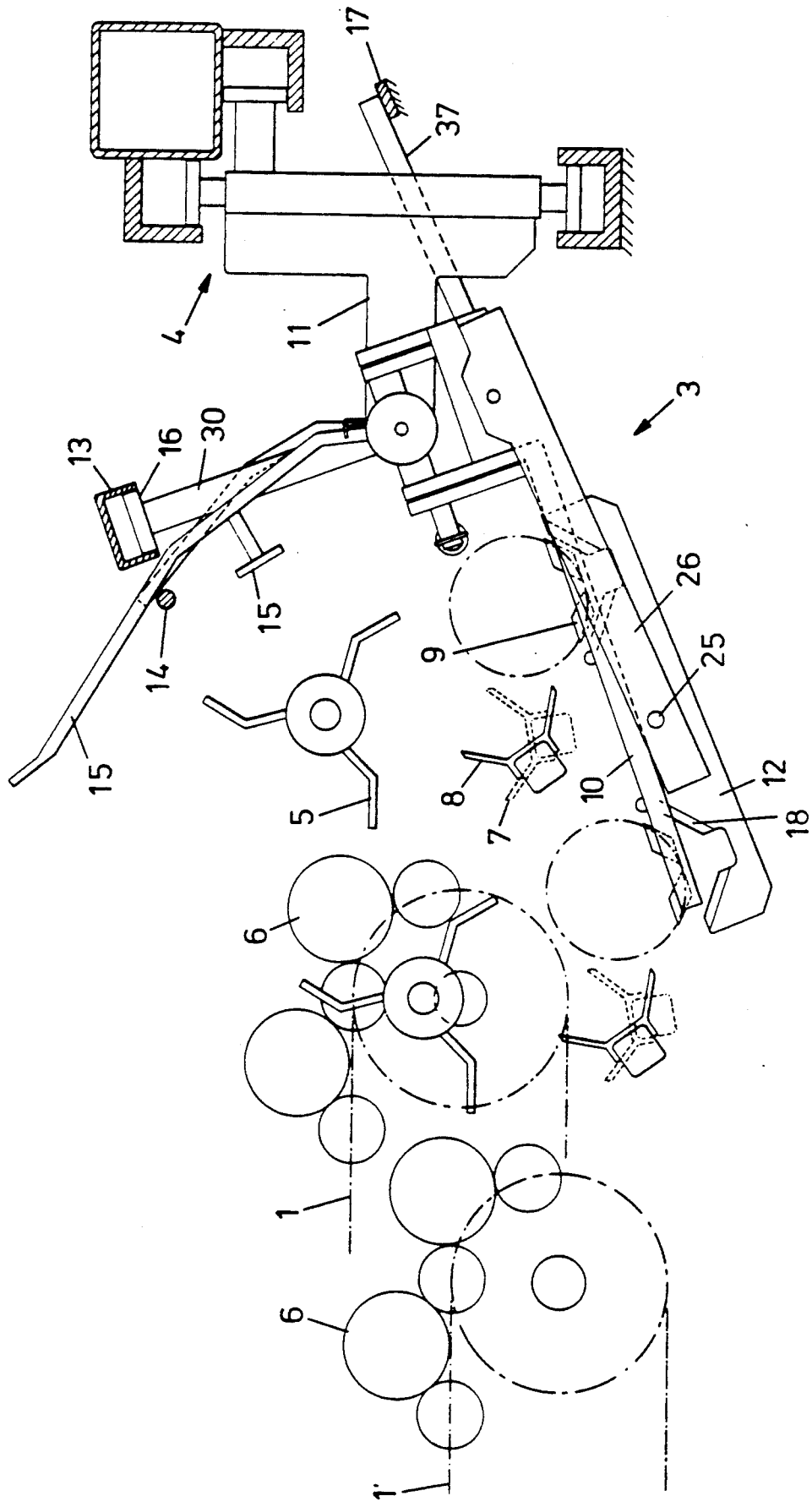
FIG. 2 is a section taken on the line II—II of FIG. 1.

The transfer of the eggs from the supply belts 1, 1' to the conveyor 4 appears from FIG. 2, which shows the two supply belts 1 and 1' by means of which eggs 6 are fed to the conveyor 4.

As will appear from FIG. 2, there is arranged downstream of each of the supply belts 1, 1' a receiving mill or turnstile 5 which guides the eggs 6 to a receiving element 7, arranged downstream of the supply belt, which element 7 after having received a row of eggs, travels in alignment with the conveyor 4 over a given distance and at the same time tilts from the position shown in dotted lines in FIG. 2 (the receiving position) into the position shown in solid lines. In the latter position, the eggs roll from the receiving element 7 into cup members 9 of spoons 10. This will not be described in further detail, since this is well known from U.S. Pat. No. 3,370,691.

The spoon 10 is pivotally connected to a holder 11 which is part of the conveyor 4. Connected pivotally to the spoon 10 are knife members 12 formed with knife edges 18.

The downward pivotal motion of the spoon 10 is effected by means of a roller 16 which runs in a guide 13 connected to a frame (not shown). The roller 16 is connected to the spoon 10 by means of a lever 30.

To ensure that the two eggs are broken simultaneously, the knife members 12 are pivotally connected by means of pins 25 to a knife holder 26 whose free end 37 is controlled over a certain distance of travel by a guide 17 rigidly connected to the frame.

Because the knife holder 26 is under the influence of a spring (not shown), the knife members 12, upon release from the guide 17, will be driven into the underside of the egg with a force determined by the spring, viz. between spaced cup members 9 of spoons 10. Each knife set 12 consists of two parallel knife members, so that after an egg has been broken, while the knife members are being moved apart, the two shell parts of the egg move apart, whereby the contents thereof are discharged downwards. Simultaneously with the discharge of the contents, the yolk and egg white are separated (see FIG. 3); however, this will not be described in further detail here as this is known as such from the prior art publication mentioned before. The egg contents are caught by cups 21 and 22 which are pivotally mounted on holders 23 which can be part of a second conveyor 24 (FIG. 3).

As will appear from the drawings, the cups 21 and 22 are pivotally mounted on the holders 23. This further allows easy cleaning of the cups 21 and 22 in the position indicated by dotted lines.

Referring to FIG. 1, it is noted that at the locations indicated at A and A', the eggs are transferred from the supply belts 1, 1' to the conveyor 4. In the subsequent portion of the path of travel, designated B, the cup members 9 are closed, i.e., (see FIG. 2) a retainer 15 is placed upon the eggs, so that the eggs cannot move upwards upon impact of the knife. The movement of the retainers 15 is controlled by means of a guide 14 which is also known as such from the prior art mentioned and therefore will not be described in further detail. After a period of rest (portion D) (necessary for synchronization of the two chains) the two knife members are moved apart (portion E), whereupon the egg is emptied and its contents are separated in portion F. During the emptying and separating stage, the first and second conveyors 4 and 24, respectively, travel in alignment, and thereafter the two conveyors separate again. In the subsequent portion of the conveyor 4 (not shown), the egg shells are removed and the apparatus is washed and dried. The same holds for the second conveyor 24.

Figure 3:
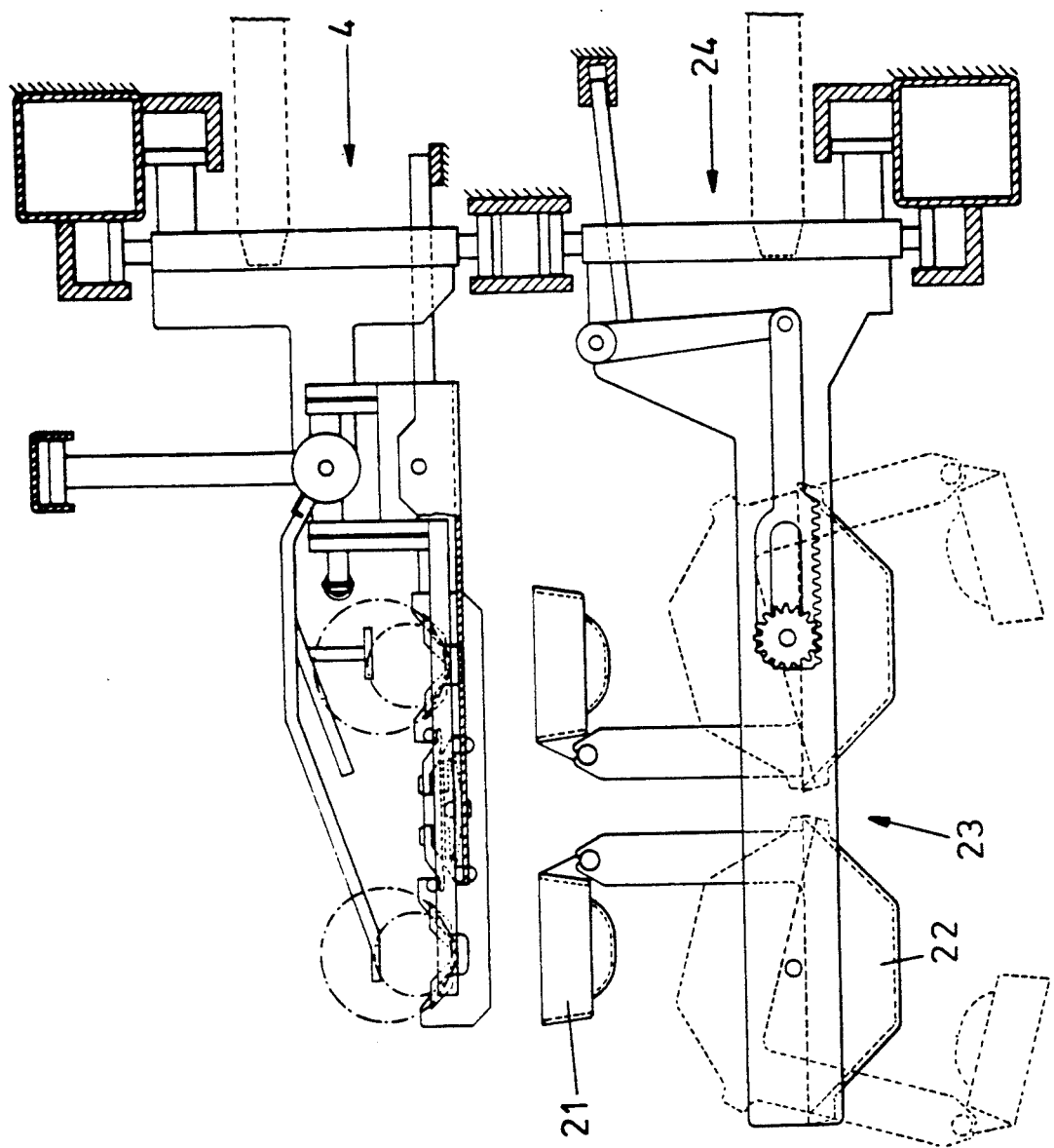
FIG. 3 is a section taken one the line III—III of FIG. 1.
Figure 4:
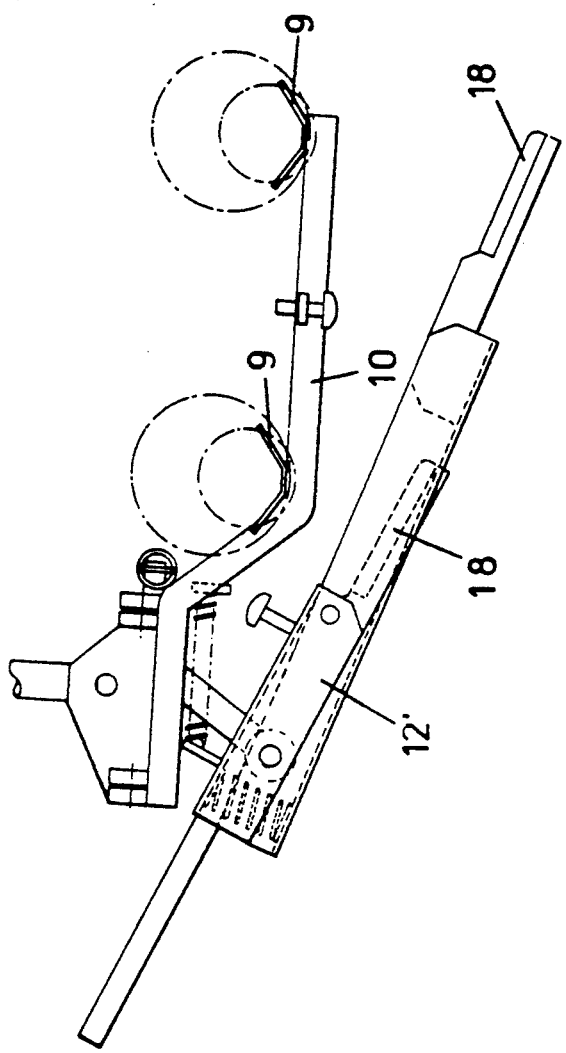
FIG. 4 is a section of a part of the apparatus according to FIG. 2.
Figure 5:
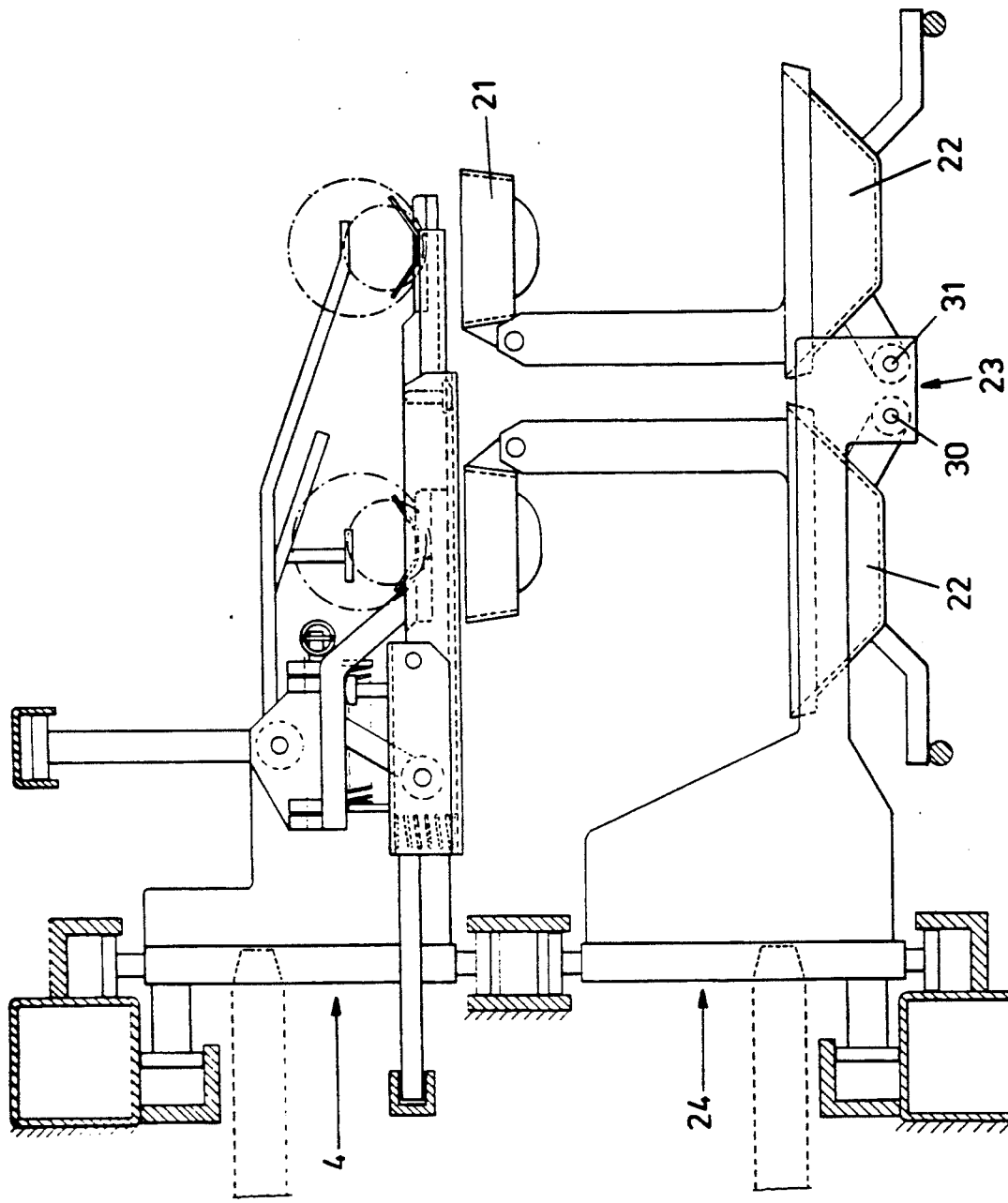
FIG. 5 is a section similar to FIG. 3 of a part of the apparatus according to another embodiment of the egg breaking apparatus according to the invention.

In the embodiment shown in FIGS. 4 and 5, similar parts are indicated by the same reference numerals as in the apparatus according to FIGS. 2-3. Known parts such as a turnstile and receiving elements have been omitted for clarity.

This embodiment likewise comprises spoons 10 with cup members 9 and knife members 12 with knife edges 18, pivotally mounted on the spoon. The drives of the spoon 10 and the knife members 12 have been omitted for clarity.

After the knife members have struck and been moved apart, the contents of the egg are caught in the manner shown in FIG. 5, while at the same time the yolk and egg white are separated. The contents of the eggs are caught by the cups 21 and 22 each in turn mounted on a holder 23 for pivotal movement about axes 30 and 31.

An important difference and advantage of the apparatus according to FIGS. 4 and 5 relative to the apparatus according to FIGS. 2 and 3 is that in the apparatus according to FIGS. 4 and 5 the cups are mutually independently suspended from the holder 23, while in the embodiment according to FIGS. 2 and 3, the cups 21, 22 are both suspended from the holder 23 by means of separate pivots, and hence can influence each other, with the understanding that sometimes after the first egg was broken, there was insufficient striking power left to break the second egg.

What is claimed is:

1. In an apparatus for breaking and opening eggs and for removing and catching the yolks and whites thereof, comprising:
   (A) a first conveyor adapted to travel in a first direction of travel;
   (B) a supply belt for supplying eggs to the first conveyor;
   (C) spaced-apart egg carriers operably and serially connected to the first conveyor for individually carrying an egg supplied from the supply belt;
   (D) an egg receiving member operably connected to each egg carrier for receiving the egg carried by said each carrier;
   (E) an egg opening element operably associated with each egg carrier for breaking and opening the egg received by the egg receiving member;
   (F) a second conveyor adapted to travel underneath and in alignment with at least a portion of travel of the first conveyor;
   (G) egg holders operably connected to the second conveyor; and
   (H) a cup member operably connected to each egg holder for catching the yolk and white of the egg openable by said opening element; the improvement comprising:
   (1) a plurality of egg carriers oriented in a direction transverse to the first direction of travel of the first conveyor;
   (2) a plurality of juxtapositioned egg receiving members on each egg carrier and being configured to receive an egg with the longitudinal axis thereof oriented in the first direction of travel of the first conveyor; and
   (3) a plurality of supply belts being equal in number to the number of juxtapositioned egg receiving members on an egg carrier and each belt being arranged such that eggs are exclusively supplied by each belt to a selected one of the juxtapositioned egg receiving members.

2. An apparatus according to claim 1, wherein each egg holder of the second conveyor comprises a plurality of separate, juxtaposed cups for receiving the yolks and white from an opened egg which cups are located under the juxtapositioned egg receiving members of the first conveyor.

3. An apparatus according to claim 1, wherein each egg carrier is pivotally connected to a holder element of the first conveyor.

4. An apparatus according to claim 3, wherein the supply belts are mounted at a different height level in such a way that a transfer end of each supply belt is located at about a same distance above an associated egg receiving member of a downwardly pivoted egg carriers.

* * * * *